(12) United States Patent
Baur et al.

(10) Patent No.: US 11,059,531 B2
(45) Date of Patent: Jul. 13, 2021

(54) MAGNETIC ROLLER

(71) Applicant: Baker Hughes Holdings LLC, Houston, TX (US)

(72) Inventors: Walter Baur, Eglsau (CH); Markus Wiesendanger, Zürich (CH)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 796 days.

(21) Appl. No.: 15/062,301

(22) Filed: Mar. 7, 2016

(65) Prior Publication Data

US 2016/0325794 A1 Nov. 10, 2016

(30) Foreign Application Priority Data

Mar. 9, 2015 (EP) ..................................... 15158211

(51) Int. Cl.
*B62D 57/024* (2006.01)
*B25J 5/00* (2006.01)
(Continued)

(52) U.S. Cl.
CPC ............ *B62D 57/024* (2013.01); *B25J 5/007* (2013.01); *B60B 15/00* (2013.01); *B60B 19/006* (2013.01);
(Continued)

(58) Field of Classification Search
CPC .................................................. B62D 57/024
See application file for complete search history.

(56) References Cited

U.S. PATENT DOCUMENTS 3,719,395 A * 3/1973 Mulasmajic ........... B60K 17/30
104/281
3,734,565 A * 5/1973 Mulasmajic .......... F16C 39/063
104/281
(Continued)

FOREIGN PATENT DOCUMENTS

CN 201484059 U 5/2010
CN 103879468 A 6/2014
(Continued)

OTHER PUBLICATIONS

Halbach-type Finite Element Analysis and Optimization of Permanent Magnet Adsorption Mechanism, Chen Yong, Nang Changming, Bao Jian-done High-tech Newsletter, vol. 23, No. 5, pp. 484-485.
(Continued)

*Primary Examiner* — Jason L Vaughan
(74) *Attorney, Agent, or Firm* — Mintz Levin Cohn Ferris Glovsky and Popeo, PC; Lisa Adams

(57) ABSTRACT

A magnetic roller for being rotatable on a ferromagnetic surface is provided. The magnetic roller includes a roller wheel having an inner space, a magnetic array arrangement and at least one first drive mechanism. Further, the magnetic array arrangement is adapted to be swivelably disposed within the inner space of the roller wheel. The magnetic array arrangement includes a strong adhesion force side and a weak adhesion force side. Furthermore, the first drive mechanism is configured to swivelably drive the magnetic array arrangement. The first drive mechanism swivelably drive the magnetic array arrangement to direct the strong adhesion force side towards the oncoming ferromagnetic surface, and, to direct the weak adhesion force side towards the foregoing ferromagnetic surface to enable the roller wheel to move forward on the ferromagnetic surface.

9 Claims, 3 Drawing Sheets

(51) Int. Cl.
*B60B 15/00* (2006.01)
*B60B 19/00* (2006.01)

(52) U.S. Cl.
CPC ... *B60B 2900/351* (2013.01); *B60B 2900/551* (2013.01); *Y10S 901/01* (2013.01); *Y10S 901/44* (2013.01)

(56) References Cited

U.S. PATENT DOCUMENTS

| | | | | |
|---|---|---|---|---|
| 4,272,781 | A * | 6/1981 | Taguchi | G01N 27/9093 348/138 |
| 5,220,869 | A * | 6/1993 | Pelrine | B62D 57/024 104/138.2 |
| 5,284,096 | A * | 2/1994 | Pelrine | B62D 49/04 104/138.2 |
| 6,792,335 | B2 * | 9/2004 | Ross | B62D 57/024 104/138.1 |
| 7,765,032 | B2 * | 7/2010 | Huston | B62D 55/265 180/164 |
| 7,958,955 | B2 * | 6/2011 | Moser | B62D 55/265 180/8.1 |
| 9,168,786 | B2 * | 10/2015 | Schlee | B60B 39/00 |
| 9,487,254 | B2 * | 11/2016 | Rochat | B62D 57/024 |
| 2002/0104693 | A1 | 8/2002 | Moore et al. | |
| 2013/0140801 | A1 | 6/2013 | Schlee et al. | |

FOREIGN PATENT DOCUMENTS

| | | |
|---|---|---|
| EP | 0 526 901 A1 | 2/1993 |
| EP | 0 878 381 A1 | 11/1998 |
| EP | 2 327 612 A1 | 6/2011 |
| EP | 2 345 902 A1 | 7/2011 |
| JP | H09175454 A | 7/1997 |
| WO | 2014165442 A2 | 10/2014 |

OTHER PUBLICATIONS

Translation of First Office Action from Chinese patent application No. 201610131955.X dated Dec. 21, 2018.

* cited by examiner

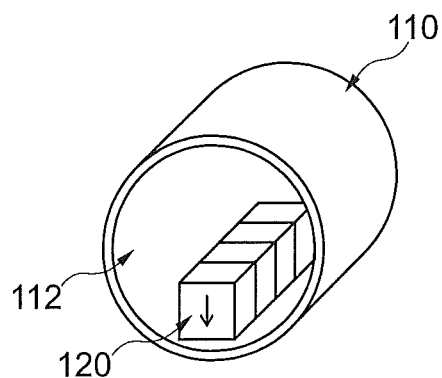
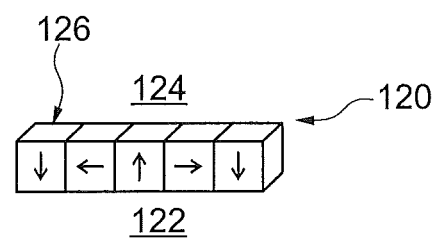
Fig. 1A
Fig. 1B
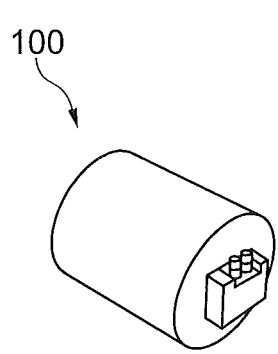
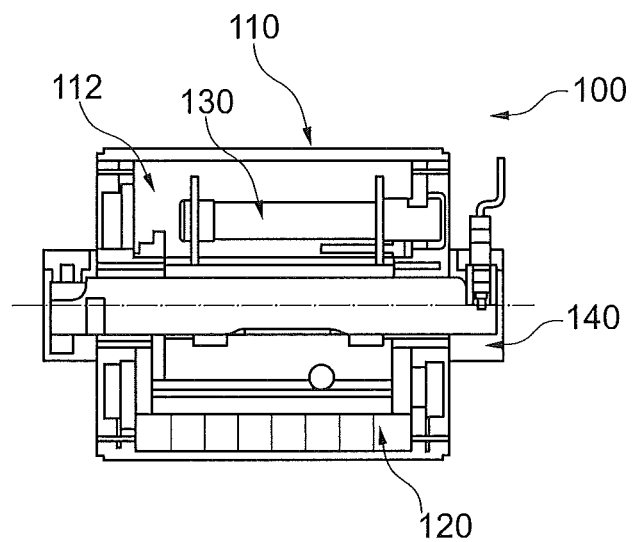
Fig. 2A
Fig. 2B

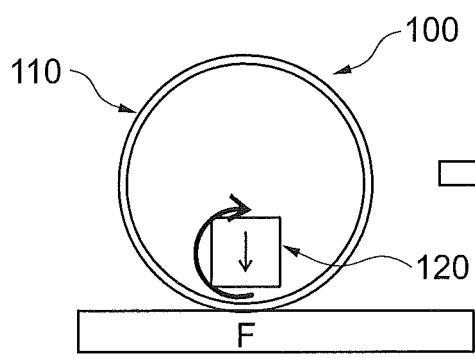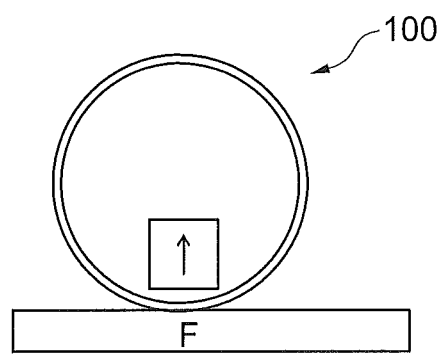
Fig. 3A  Fig. 3B
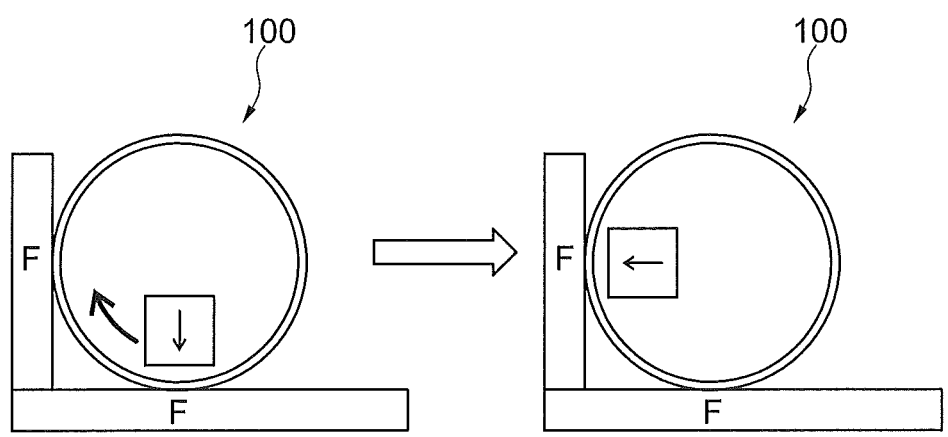
Fig. 4A  Fig. 4B

MAGNETIC ROLLER

CROSS-REFERENCE TO RELATED APPLICATIONS

This application claims priority to European Patent Application No. 15158211.1 filed Mar. 9, 2015, the contents of which are hereby incorporated in its entirety.

TECHNICAL FIELD

The present disclosure generally relates to magnetic rollers for ferromagnetic surface, which may, for example, be installed with inspection devices or robots for inspection of hard-to-reach inner spaces of boilers or turbines.

BACKGROUND

To move inspection device or any other device on a ferromagnetic surface, more often than not, magnetic wheels are used for adhesion. However, such magnetic wheels may generally be cumbersome in terms of managing the magnetic adhesion force in case when it is strong, and also in terms of directing the magnetic adhesion force in a given direction or that of taking off the device with the magnetic wheel out of the inspection locations.

Generally, there may be such arrangement where non-magnetic ramp may be used to reduce the problems relating to managing the magnetic adhesion force, but this seems ineffective in case of hard to reach inspection locations. Further, one may have lever or handle arrangement incorporated in the inspection devices with magnetic wheels that may be used to lift the inspection device, but this seems ineffective as the magnetic adhesion force is still in working. Furthermore, there are also available magnetic wheels with ferromagnetic shoes which have typically short force or limited field, which are generally undesirable. Such available solutions seem ineffective to manage the challenges like wall transition or obstacle navigation in the inspection locations.

Accordingly, there exists a need to obviate the aforementioned problems, and provide an effective solution.

SUMMARY

The present disclosure discloses a magnetic roller that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a magnetic roller that may be capable of easily manipulating magnetic adhesion force to easily navigate in a given direction on a ferromagnetic surface. An object of the present disclosure is to describe an inspection device incorporating such a magnetic roller.

In one aspect of the present disclosure, a magnetic roller for being rotatable on a ferromagnetic surface is provided. The magnetic roller includes a roller wheel, a magnetic array arrangement and at least one first drive mechanism. The roller wheel includes an inner space. Further, the magnetic array arrangement is adapted to be swivelably disposed within the inner space of the roller wheel. The magnetic array arrangement includes a strong adhesion force side and a weak adhesion force side. Furthermore, the first drive mechanism is configured to swivelably drive the magnetic array arrangement. The first drive mechanism swivelably drive the magnetic array arrangement to direct the strong adhesion force side towards the oncoming ferromagnetic surface, and, to direct the weak adhesion force side towards the foregoing ferromagnetic surface to enable the roller wheel to move forward on the ferromagnetic surface.

In one embodiment, the magnetic roller further includes at least one second drive mechanism configured to drive the roller wheel.

In one embodiment, the magnetic array arrangement may include permanent magnets arranged in Halbach array arrangement.

In one aspect of the present disclosure, an inspection robot is provided. The inspection robot is capable for independent inspection of a boiler wall or any inner structure, which are bounded by ferromagnetic surface. The inspection robot includes at least one magnetic roller incorporated therein for enabling the inspection robot to move on the by ferromagnetic surface.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

FIGS. 1A and 1B, respectively, illustrate example diagrammatic sketches of magnetic array arrangement, and a magnetic roller incorporated therein, in accordance with one exemplary embodiment of the present disclosure;

FIGS. 2A and 2B, respectively, illustrate example perspective and cross sectional view of a magnetic roller, in accordance with one exemplary embodiment of the present disclosure;

FIGS. 3A and 3B, illustrate operation of the magnetic roller on a ferromagnetic surface, in accordance with another exemplary embodiment of the present disclosure;

FIGS. 4A to 4B illustrate operation of the magnetic roller on a ferromagnetic wall arrangement, in accordance with another exemplary embodiment of the present disclosure;

Like reference numerals refer to like parts throughout the description of several views of the drawings.

DETAILED DESCRIPTION

Figure 5:
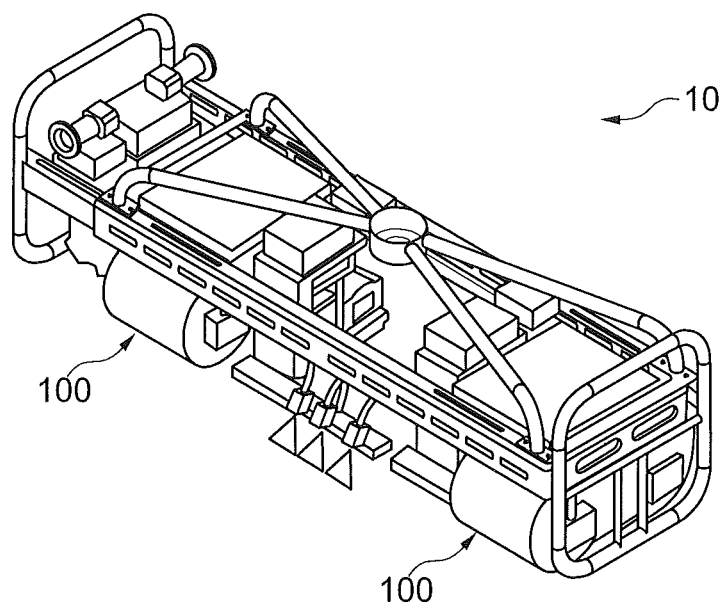
FIG. 5 illustrates an inspection robot incorporating the magnetic roller of FIGS. 2A and 2B.

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms used herein do not denote any order, elevation or importance, but rather are used to distinguish one element from another. Further, the terms "a," "an," and "plurality" herein do not denote a limitation of quantity, but rather denote the presence of at least one of the referenced item.

Referring to FIGS. 1A, 1 B, 2A and 2B, example diagrammatic illustrations of a magnetic roller 100 are depicted in accordance with an exemplary embodiment of the present disclosure. The magnetic roller 100 may be capable of being rotatable on a ferromagnetic surface 'F'. The magnetic roller 100 includes a roller wheel 110, a magnetic array arrangement 120 and at least one first drive mechanism 130.

As shown in FIG. 1A, the roller wheel 110 may include an inner space 112 configured therewithin. The roller wheel 110 may be made of material, for example a plastic, which has no magnetic screening effect. The material may be selected so that the roller wheel 100 may also have sufficient grip on a surface, which is provided to it. Further, the wheel 110 may include coating or may have elements, such as transverse ribs, which bring about improved grip on such surface.

Further, the magnetic array arrangement 120 may be adapted to be swivelably disposed within the inner space 112 of the roller wheel 110. The magnetic array arrangement 120 is capable of being freely swivelable or rotatable in the inner space 112 as per the requirement and depending upon the movement of the magnetic roller 100 on the ferromagnetic surface 'F' or wall. In one preferred embodiment, the magnetic array arrangement 120 may include various permanent magnets 126 arranged in Halbach array arrangement, as shown in FIG. 1B, to configure the magnetic array arrangement 120 that augments the magnetic field on one side of the array while cancelling the field to near zero on the other side, thereby configuring a strong adhesion force side 122 and a weak adhesion force side 124 of the magnetic array arrangement 120.

To enable the magnetic array arrangement 120 to freely swivelable or rotatable in the inner space 112, the first drive mechanism 130, as shown in FIGS. 2A and 2B, is configured to the magnetic array arrangement 120. The first drive mechanism 130 is adapted to swivelably drive the magnetic array arrangement 120 to direct the strong adhesion force side 122 towards the oncoming ferromagnetic surface 'F,' and, the weak adhesion force side 124 towards the foregoing ferromagnetic surface 'F' to enable the roller wheel 110 to move forward on the ferromagnetic surface. The weak adhesion force side 124 may include very weak adhesion nearly equal to null, enabling adhesion force nearly equal to null.

In one embodiment, as shown in FIGS. 2A and 2B, the magnetic roller 100 may include least one second drive mechanism 140 configured to drive the roller wheel 110, separate from the first drive mechanism 130. The first and second drive mechanisms 130 and 140, respectively, may be configured within the inner space 112 of the roller wheel 110. However, without departing from the scope of the present disclosure, the first and second drive mechanisms 130 and 140 may be configure outside of the inner space 112 of the roller wheel 110. Further, in an embodiment, without departing from the scope of the present disclosure, only one drive mechanism may be incorporated, instead of two, to operate the roller wheel 110 and the magnetic array arrangement 120.

In operation, as shown in FIGS. 3A and 3B, the magnetic roller 100 is capable of effectively rolling on the ferromagnetic surface 'F.' In order to ascend the magnetic roller 100 on the ferromagnetic surface 'F," effectively, the magnetic array arrangement 120 may be rotated to manipulate magnetic adhesion force to easily navigate in a given direction on the ferromagnetic surface 'F.' For example, the strong adhesion force side 122 (indicated by downside arrow) of the magnetic array arrangement 120 may be directed towards the oncoming ferromagnetic surface 'F', and, the weak adhesion force side 124 (indicated by upside arrow) towards the foregoing ferromagnetic surface 'F,' thereby allowing the magnetic roller 100 to grip with the oncoming surface and release the foregoing or leaving surface and navigate more freely on the ferromagnetic surface 'F.' Similarly, as shown in FIGS. 4A and 4B, the magnetic roller 100 is capable of effectively rolling on walls with the ferromagnetic surface 'F.' In such scenario, for example, the strong adhesion force side 122 of the magnetic array arrangement 120 is directed towards the oncoming wall.

The magnetic roller 100 of the present invention may be incorporated in any suitable device or arrangement capable of performing intended purpose. For example, as shown in FIGS. 5 and 6A to 6D, the magnetic roller 100 may be incorporated in an inspection robot 10 for independent inspection of boiler walls 12 or steam or gas turbines bounded by a ferromagnetic surface 14. Depending upon the inspection robot 10 designs, the number of the magnetic roller 100 may be varied. In as much as the construction and arrangement of the inspection robot 10, various associated elements may be well-known to those skilled in the art, it is not deemed necessary for purposes of acquiring an understanding of the present disclosure that there be recited herein all of the constructional details and explanation thereof. Rather, it is deemed sufficient to simply in the inspection robot 10, only those components are described that are relevant for the description of various embodiments of the present disclosure.

Figure 6A:
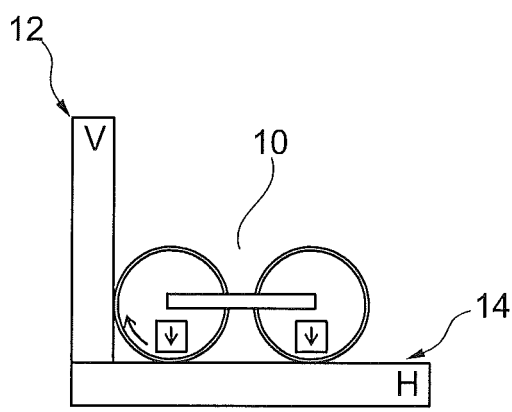
FIGS. 6A to 6D illustrate operation of the inspection robot incorporating the magnetic roller on a ferromagnetic wall arrangement.
Figure 6B:
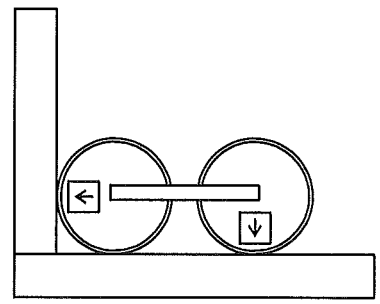
Figure 6C:
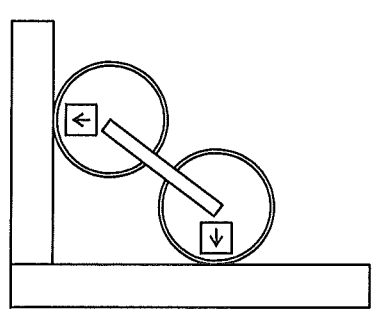
Figure 6D:
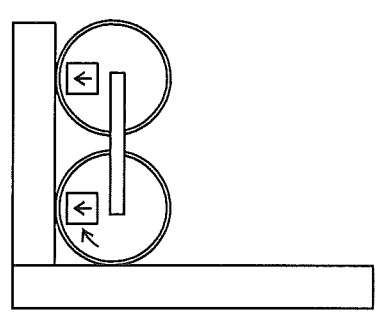

As shown in FIGS. 6A to 6D, in operation, the inspection robot 10 with two magnetic rollers 100 is adapted to ascend on the ferromagnetic wall arrangement 12 of the boiler and will be described in conjunction with other figures. In FIG. 6A, the strong adhesion force sides 122 of the magnetic array arrangement 120 in both the magnetic rollers 100 are towards the horizontal wall 'H'. When the front magnetic roller 100 is about to move on the vertical wall 'V,' as shown in FIGS. 6B and 6C, the strong adhesion force sides 122 of the magnetic array arrangement 120 is adapted to be swivelled or rotated via the first drive mechanism 130 to face the vertical wall 'V' while the weak adhesion force sides 124 of the rear magnetic roller 100 faces the horizontal wall 'H.' Further, when rear magnetic roller 100 faces the vertical wall 'V,' the strong adhesion force sides 122 of the magnetic array arrangement 120 swivelled via the first drive mechanism 130 to face the vertical wall 'V.' The magnetic array arrangement 120 is capable of actively swivelled inside the magnetic roller 100 via the first drive mechanism 130 to enable to face the strong adhesion force sides 122 towards the oncoming wall so that the inspection robot 100 may do wall to wall transition, which would otherwise would have remained stuck to the wall currently driving on.

The magnetic roller 100 of the present disclosure is advantageous in various scopes such as described above. The roller is capable of easily manipulating magnetic adhesion force to easily navigate in a given direction on a ferromagnetic surface. Further when such roller are incorporated in any suitable device, such as inspection device, it enables the inspection device to do wall to wall transition, which would otherwise would have remained stuck to the wall currently driving on.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A magnetic roller for being rotatable on a ferromagnetic surface comprising:
   a roller wheel having an inner space;
   a magnetic array arrangement swivelably disposed within the inner space of the roller wheel, the magnetic array arrangement having a strong adhesion force side and a weak adhesion force side, wherein the magnetic array arrangement comprises permanent magnets arranged in Halbach array arrangement;
   at least one first drive mechanism configured to swivelably drive the magnetic array arrangement to direct: the strong adhesion force side towards the oncoming ferromagnetic surface, and, the weak adhesion force side towards the foregoing ferromagnetic surface to enable the roller wheel to move forward on the ferromagnetic surface, wherein an orientation of the strong adhesion force side and the weak adhesion force side of the magnetic array arrangement are each independent of the rotation of the roller wheel; and
   at least one second drive mechanism configured to drive a rotation of the roller wheel, wherein the first drive mechanism is operationally independent of the second drive mechanism,
   wherein the at least one first drive mechanism is configured for active swiveling inside the magnetic roller during operation of the at least one second drive mechanism, wherein the at least one second drive mechanism is within the inner space of the roller wheel, and
   wherein during operation of the magnetic roller, the magnetic array is configured to rotate about an axis that is axially offset from an axis of rotation of the roller wheel.

2. An inspection robot for independent inspection of boiler walls, which are bounded by a ferromagnetic surface, comprising at least one magnetic roller as claimed in claim 1 for enabling the inspection robot to move on the boiler wall.

3. The magnetic roller of claim 1, wherein the axis of rotation of the magnetic array arrangement is parallel with the axis of rotation of the roller wheel.

4. An inspection robot for independent inspection of boiler walls, the inspection robot comprising:
   a body;
   a set of roller wheels coupled to the body, each of the set of roller wheels having an inner space and configured for movement on a ferromagnetic surface;
   a set of magnetic array arrangements each swivelably disposed within the inner space of one of the set of roller wheels, the magnetic array arrangement having a strong adhesion force side and a weak adhesion force side;
   a set of first drive mechanisms each configured to swivelably drive one of the set of the magnetic array arrangements to direct:
     the strong adhesion force side towards the oncoming ferromagnetic surface, and,
     the weak adhesion force side towards the foregoing ferromagnetic surface to enable the roller wheel to move forward on the ferromagnetic surface; and
   a second drive mechanism configured to drive a rotation of the set of roller wheels, wherein the set of first drive mechanisms is operationally independent of the second drive mechanism,
   wherein the second drive mechanism is within the inner space of one of the set of roller wheels, and
   wherein each of the set of magnetic array arrangements rotates about an axis that is axially offset from an axis of rotation of the roller wheel in which the magnetic array arrangement is located.

5. The inspection robot of claim 4, wherein at least one of the plurality of magnetic array arrangements includes permanent magnets arranged in Halbach array arrangement.

6. The inspection robot as claimed in claim 5, wherein an orientation of the strong adhesion force side and the weak adhesion force side of each of the set of magnetic array arrangements is independent of the rotation of the set of roller wheels.

7. The inspection robot of claim 5, wherein the axis of rotation of the magnetic array arrangement is parallel with the axis of rotation of the roller wheel.

8. The inspection robot as claimed in claim 4, wherein each of the set of first drive mechanisms is configured for active swiveling inside a respective one of the set of magnetic rollers during operation of the second drive mechanism.

9. The inspection robot of claim 4, wherein each of the set of magnetic array arrangements rotates about an axis that is axially offset from the other magnetic array arrangements in the set.

\* \* \* \* \*